Nov. 10, 1936.  H. S. VINCENT  2,060,435
DEVICE FOR THE CONSERVATION AND TREATMENT OF
FOODS AND BEVERAGES, AND UTENSILS THEREFOR
Filed April 25, 1933    5 Sheets-Sheet 1

Inventor
Howell S. Vincent
By Ogle R. Singleton
Attorney

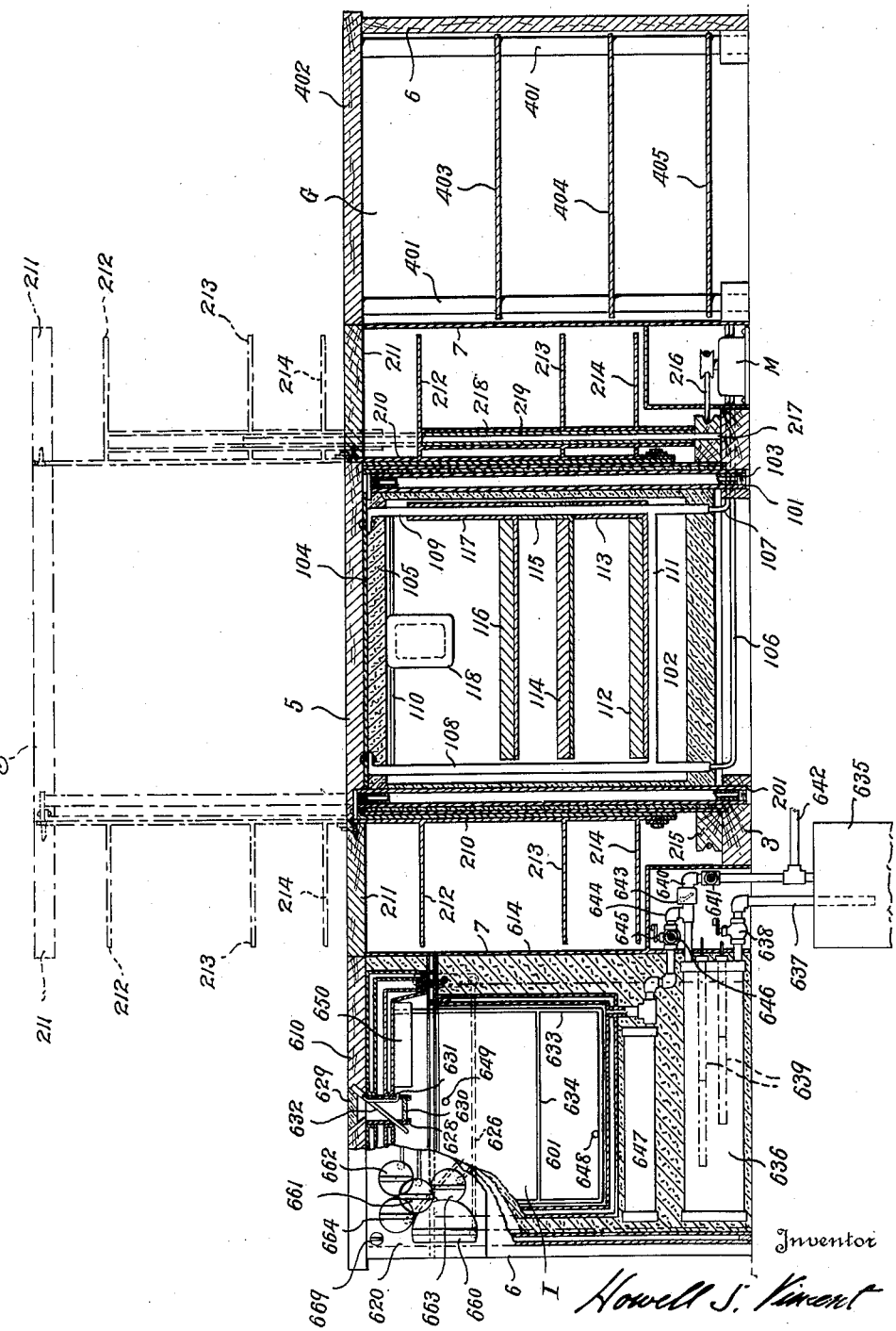

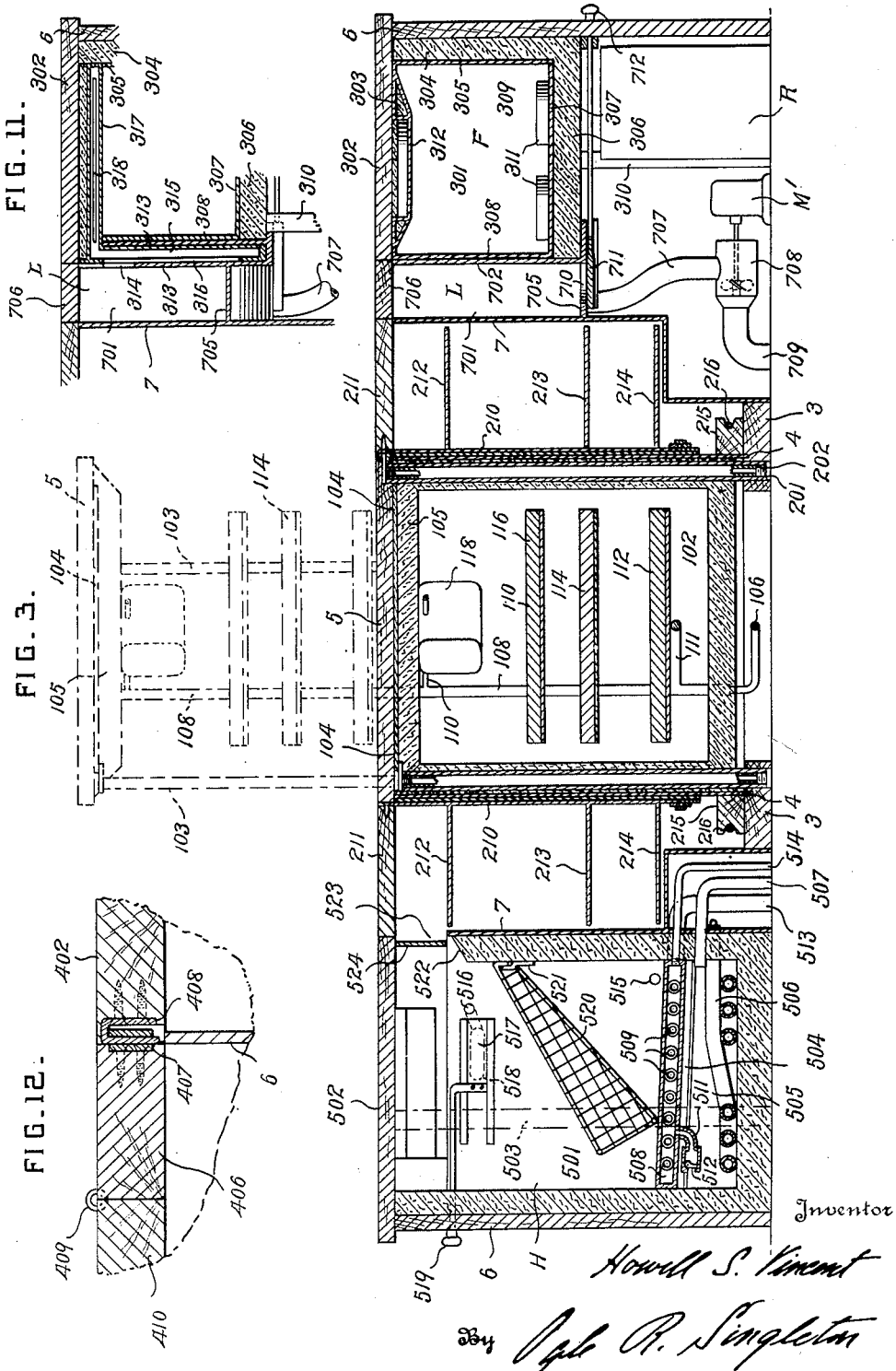

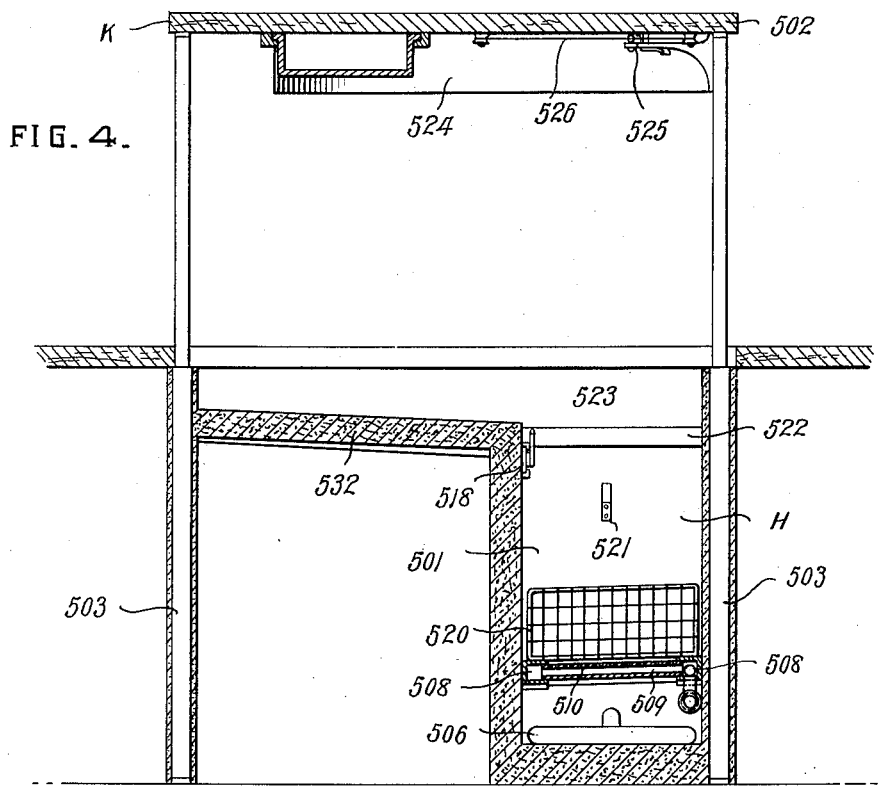
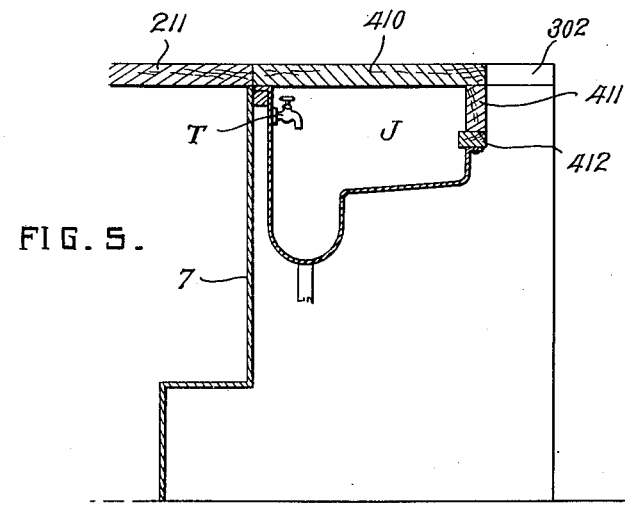

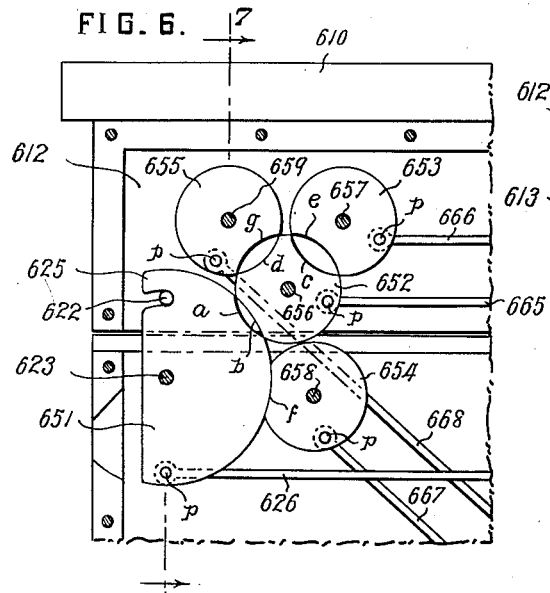
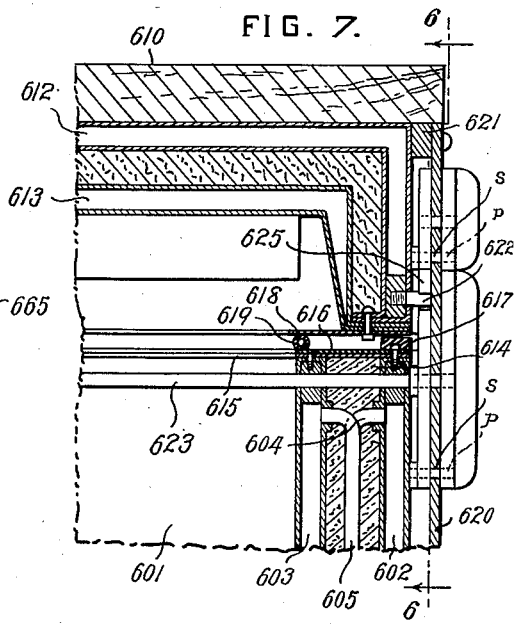
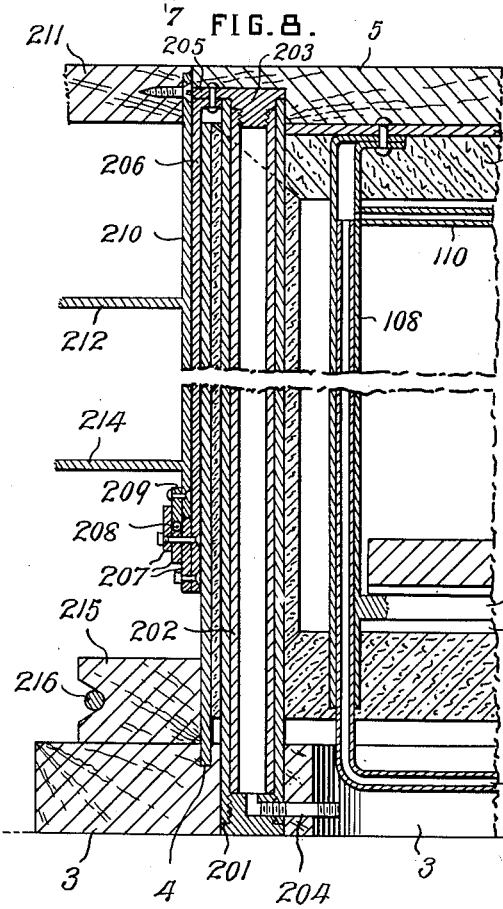
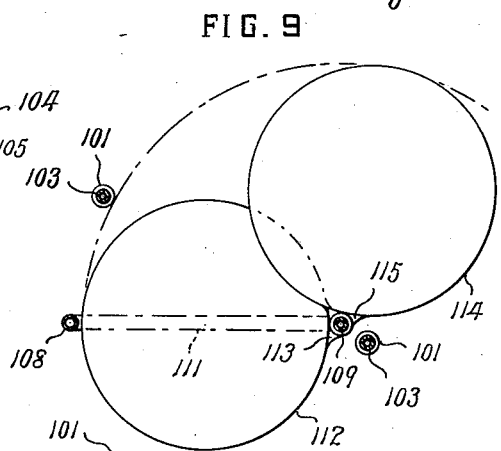
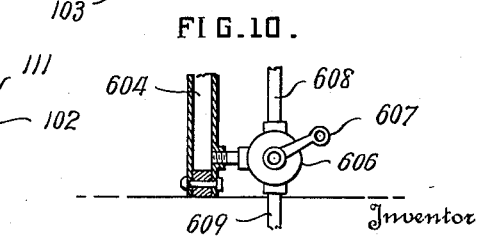

Patented Nov. 10, 1936

2,060,435

UNITED STATES PATENT OFFICE 2,060,435

DEVICE FOR THE CONSERVATION AND TREATMENT OF FOODS AND BEVERAGES, AND UTENSILS THEREFOR

Howell S. Vincent, Sutton, N. H.

Application April 25, 1933, Serial No. 667,928

8 Claims. (Cl. 312—146)

My invention consists in a new and useful improvement in a device for the conservation and treatment of foods and beverages, and utensils therefor, described and claimed in my former application Serial Number 354,967 which was abandoned, and is designed more particularly to provide a mechanism for the practice of the domestic activities requisite for the proper preparation and consumption of food, under conditions and circumstances which enable the operator to perform substantially all the requisite activities while seated at a table. My improved device is so designed as to afford means for preparing, consuming and serving food and drink, all of said means being disposed within the compass of a single structure so designed as to be contained beneath a dining room table of usual dimensions.

The particularly novel feature of the use of my device is the fact that substantially all of the steps can be practiced by the operator while seated, and without removing from the single seat. When the very wide variety of steps is considered, the great utility of this feature is obvious. By the use of my device, a housewife is enabled to perform substantially all of the requisite labor incident to the proper preparation, conservation and disposition of food and drink, while remaining seated at the table. Moreover, the requisite labor of disposition of food and drink refuse and cleaning of preparing and serving utensils can also be accomplished by the use of my device.

In the drawings filed herewith, I have illustrated one specific embodiment of my invention, but it is to be distinctly understood that I do not consider my invention limited to said specific embodiment, but refer for its scope to the claims appended hereto.

In the drawings:

Fig. 2 is a vertical section on the line 2—2 of Fig. 1.

Fig. 3 is a vertical section on the line 3—3 of Fig. 1.

Fig. 4 is a vertical section on the line 4—4 of Fig. 1.

Fig. 5 is a vertical section on the line 5—5 of Fig. 1.

Fig. 6 is a vertical section on the line 6—6 of Fig. 7.

Fig. 7 is a vertical section on the line 7—7 of Fig. 6.

Fig. 8 is an enlarged vertical section of a portion shown in Fig. 2.

Fig. 9 is a plan view of a portion shown in Fig. 2.

Fig. 10 is a side elevation partly in section of a detail.

Fig. 11 is a fragmentary vertical section on the line 11—11 of Fig. 1.

Fig. 12 is a fragmentary vertical section on the line 12—12 of Fig. 1.

Figure 1:
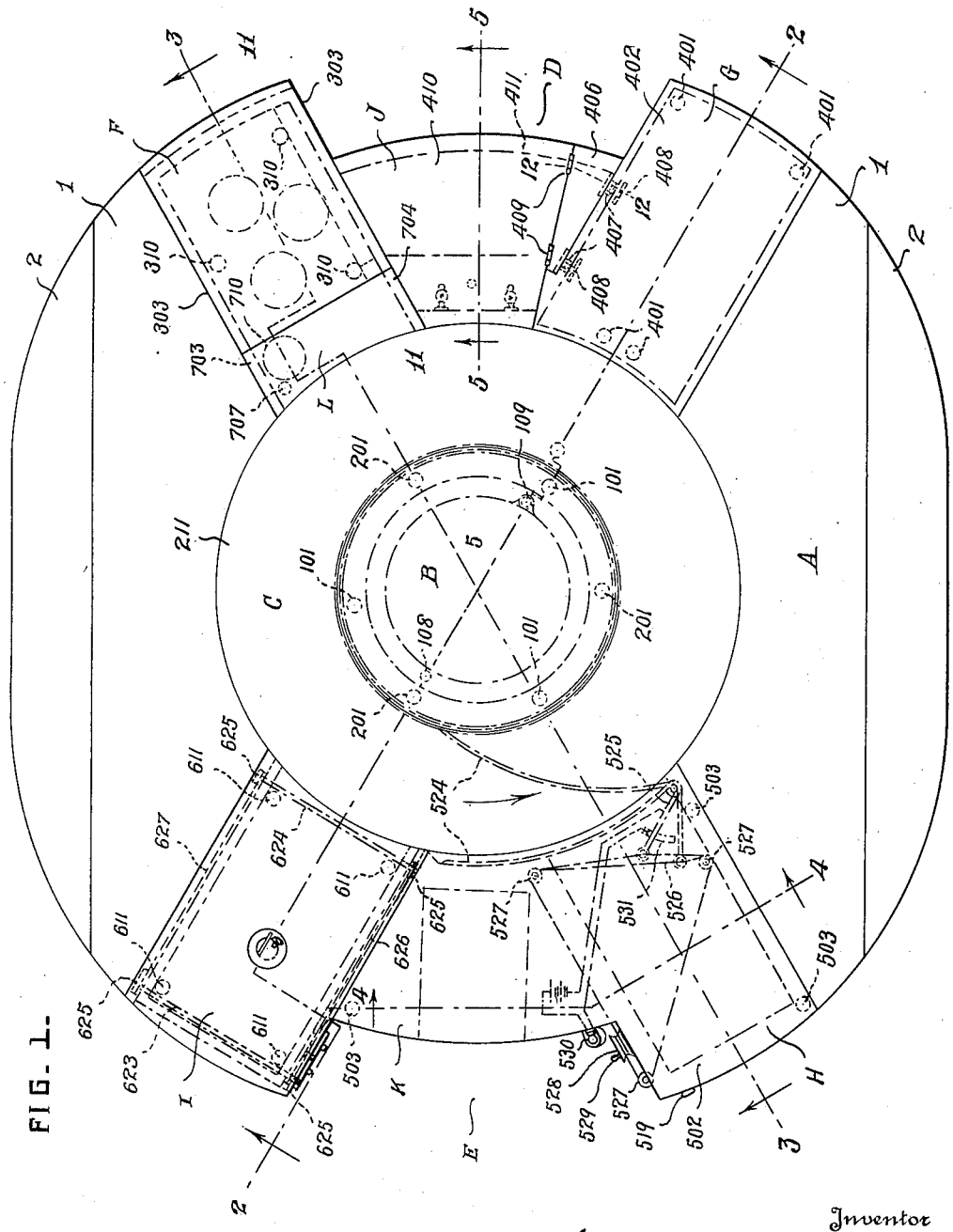
Fig. 1 is a top plan view of my device.

As illustrated in the drawings, my device consists of a substantially circular table formed by main frame work A containing the several operative structures. In the centre there is the circular refrigerating receptacle B, surrounded by the circular rotatable and vertically movable conveyor and storage cabinet C. The framework A is designed to provide two niches D and E to accommodate the operators of my device. On the right side of the niche D there is positioned the vertically movable combined grill and oven compartment F and on the left side of the niche D there is positioned the vertically movable cabinet G. On the right side of the niche E, there is positioned the dish washer H and on the left side of the niche E, there is positioned the pressure cooker I. Between the parts F and G and directly in front of the niche D, there is positioned the sink J. Between the parts H and I, and directly in front of the niche E, there is positioned a vertically movable shelf K. Located between the grill and oven compartment F and the portion of the conveyor and cabinet C adjacent thereto, there is disposed the desiccator L. The main framework A is composed of the fixed top portions 1, 1, to which are hinged the extensions 2, 2, the annular base 3 on which is mounted the annular fixed wall 4 on which is the top 5, and the two fixed walls 6 and 7, between which are disposed the operative structures F, G, H, I and L of my device. It is to be understood that each of the several operative structures B, C, F, G, H, I, J, K and L has a top portion, and that when the parts are in normal position all of the top portions are in the same horizontal plane, thus forming a complete and substantially circular top for my device, which is adapted to serve as a table.

I will now describe the construction of the refrigerating receptacle B (illustrated in Figs. 1, 2, 3, 8 and 9). Three tubes 101 are suitably disposed about the circumference of the base 3. Suitably mounted between these tubes 101, there is the insulated circular chamber 102, about which is the fixed wall 4 of the frame A. Mounted in the tubes 101 are the piston tubes 103, conduits for conducting compressed air to the tubes 101 to operate the piston tubes 103 being suitably provided. Carried by the piston tubes 103 there is the cover 104 having the insulated lining 105. Suitable refrigerating circuit pipes 106 and 107 pass through the bottom of the chamber 102, from the refrigerating mechanism R. Slidable over these pipes 106 and 107 are the pipes 108 and 109 respectively, attached to the top 104 and connected by the pipe 110 and the rod 111. Supported by the rod 111 there is the circular tray 112 rotatably mounted by the sleeve 113 on the pipe 109, and above it the circular tray 114 supported by the sleeve 113 and rotatably mounted by the sleeve 115 on the pipe 109, and above it a third circular tray 116 supported by the sleeve 115 and rotatably mounted by the sleeve 117 on the pipe 109. I also provide a suitable ice making chamber 118 mounted upon the underside of the top 104 and operated by refrigeration supplied by pipe 110.

I will now describe the construction of the conveyor and storage cabinet C (illustrated in Figs. 1, 2, 3 and 8). Suitably mounted in the base 3 and adjacent the outside of the wall of the chamber 102, there are three tubes 201, in which are slidably mounted tubes 202 having piston heads 203 thereon, conduits 204 to conduct compressed air to the tubes 202 to operate piston heads 203 being suitably provided. Integral with each head 203 there is a finger 205, and depending from these fingers 205, there is a cylindrical hanger 206 carrying at its bottom three annuli 207 so disposed as to form a trackway 208 in which is slidably mounted a shoe 209 carrying thereon the cylindrical frame 210 of the conveyor and storage cabinet C, to which is attached the annular top 211 adapted to surround the top 5 and annular shelves 212, 213 and 214.

Suitably mounted for rotation upon the base 3 there is the pulley 215 which is connected by the belt 216 with any suitable prime mover, as for example, the motor M. Suitably mounted upon the pulley 215 there is the post 217 received in the telescoping sleeves 218 and 219 carried by the frame 210.

I will now describe the construction of the grill and oven compartment F (illustrated in Figs. 1, 3 and 11). Between the walls 6 and 7, at the point indicated in Fig. 1, I provide a vertically movable insulated chamber 301 having the insulated top 302 with an inner lining 303, the outer insulated end wall 304 with inner lining 305, the insulated bottom 306 with inner lining 307, the inner uninsulated end wall 308, the rear insulated side wall (not shown) with inner lining 309. The side of the chamber 301 which is toward the niche D is open for access, but I may provide a suitable movable closure therefor, if desired.

I provide three elevating means 310 of design similar to the lifting means provided for the refrigerating chamber B heretofore described, upon which the chamber 301 is mounted.

Upon the lining 307 of the bottom 306 of the chamber 301, I provide any desired number of electric hot plates 311, and depending from the top 302 I provide the hot plate 312.

Suitably supported from the wall 7 at a point adjacent the bottom 306 of the chamber 301, at its inner corner adjacent the niche D, there is the pipe 313 square in cross section which passes upwardly in juxta-position with the wall 308 which is disposed at that point to encase the pipe 313 on two of its sides. This pipe 313 is provided near its upper end on its side away from the chamber 301 with a port 314. Slidably received in the pipe 313 is the pipe 315 having the elongated slot 316 so disposed as to be in constant register with the port 314 in the pipe 313. The pipe 315 is supported by its elbow 317 attached to the inner side of the top 302 and disposed adjacent the front edge thereof, and provided with the longitudinal slot 318.

I will now describe the construction of the cabinet G (illustrated in Figs. 1, 2, 5 and 12). Between the walls 6 and 7 of the frame A, at the point indicated in Fig. 1, there are positioned four elevators 401 which are similar in construction to the elevating means heretofore described for the other vertically movable portions of my device. Mounted upon these elevators 401 are the top 402 and the shelves 403, 404 and 405. Disposed in the horizontal plane of the top 402 on its side adjacent the niche D is the segmental top section 406 suitably provided on its side adjacent the top 402 with a pair of stirrups 407 in which are slidably received the fingers 408 mounted on the top 402. The top section 406 carries by the hinges 409 the lid 410 having the depending apron 411 adapted to be received upon the sill 412 of the sink J when the lid 410 is in normal position.

I will now describe the construction of the dish washer H (illustrated in Figs. 1, 3 and 4). Between the walls 6 and 7 of the frame A, at the point indicated in Fig. 1, I provide an insulated chamber 501 having the vertically movable cover 502 which is made integral with the shelf K which it operates. This cover 502 is mounted on three elevators 503 which are similar in construction to the other elevating means heretofore described. The chamber 501 has the partition 504 formed as will be presently explained near its bottom forming the heating chamber 505 in which are positioned the electric heating coils 506 and into which discharges the water supply pipe 507. Directly above the partition 504 there are the manifolds 508 connected by the series of pipes 509, the spaces between which are filled with any suitable material to form the partition 504. Each pipe 509 has in its upper surface openings 510. Passing through the partition 504 and connecting the heating chamber 505 with one of the manifolds 508 is the pipe 511 with the check valve 512. To one of the manifolds 508 there is connected the water supply pipe 513, and to the other manifold 508 there is connected the compressed air supply pipe 514. The chamber 501 has, near its bottom, the controlled vent 515 and, near its top, the over-flow vent 516 adjacent which is the discharge opening 517 controlled by the slide valve 518 operated by the handle 519 passing through the wall 6. For the dish washer H, I provide a wire dish rack 520 which when inverted and attached to the hook 521 (as illustrated in Fig. 3) serves as an incline for receiving dishes into the washer H, over the inclined lip 522 below the opening 523 of the washer H, which registers with the shelf 212 of the conveyor C.

Pivotally mounted on the under side of the top 502 is the arcuate baffle plate 524 corresponding with the circumference of the conveyor C and normally beneath the top 502 at its inner edge above the wall 7 of the frame A. This plate 524 has the crank arm 525 to which is attached the operating cord 526 rove over the pulleys 527 and the reel 528 having the handle 529 located on the outside of the dish washer H adjacent the niche E.

I provide a signal light 530 positioned in the front edge of the top 502, in circuit with the arm 525 and contact switch 531, so that the light 530 serves to indicate the movement of the plate 524 from normal position. A second signal light may be connected in this circuit and positioned at some convenient point in the wall 6 adjacent the niche D.

Below the shelf K and adjacent the open top of the chamber 501 of the dish washer H, I provide a dish assembly drain board 532 inclined toward the chamber 501.

I will now describe the construction of the pressure cooker I (illustrated in Figs. 1, 2, 6, 7, and 10). Between the walls 6 and 7 of the frame A, at the point indicated in Fig. 1, I provide the insulated chamber 601 having the outer water jacket 602 and the inner water jacket 603 having supply pipes 604 and 605 respectively. The pipe 604 is provided at its end at the bottom of the cooker I with a three-way cock 606 having the operating handle 607, the supply pipe 608 and the waste pipe 609. The pipe 605 is also provided with a similar cock. The chamber 601 has a vertically movable top 610 mounted upon elevating means 611 similar to those heretofore described for the other vertically movable elements of my device. The top 610 has an outer water jacket 612 and an inner water jacket 613 provided with extensible hose connections (not shown) connected with supply pipes 604 and 605 respectively.

The insulated wall 614 of the chamber 601 is provided at its top with a circumferential plate 615 on which is mounted a rubber gasket 616, on which at its outer edge is mounted the rubber buffer 617. To the lower side of the top 610 there is suitably attached the circumferential flexible back pressure lip 618 which extends inwardly from the lower edge of the top 610, and carries at the inner edge the cylindrical rubber gasket 619 to co-act with the gasket 616.

Suitably mounted on the outer face of the wall 614 at a point adjacent the niche E, there is a plate 620 which projects upwardly above the upper end of the wall 614, beside the top 610, fitted under the upper surface thereof, and braced by a strut 621 extending between the walls 6 and 7.

Suitably mounted at the four corners of the top 610, adjacent its lower edge, there are the pins 622. Suitably journaled in the wall 614 are the two rock-shafts 623 and 624, the former passing through the plate 620. Mounted on each end of these shafts 623 and 624, on the outside of the wall 614, is a hook 625 adapted to co-act with one of the pins 622 to lock the cover 610 upon the chamber 601. I connect the hook 625 located adjacent the wall 620 to one of the hooks 625 adjacent the wall 7 by a pitman rod 626 and also connect the other two hooks 625 by a similar rod 627.

At a suitable point in the upper surface of the top 610, there is provided a well 628 closed at its top and bottom by transparent plates 629 and 630 respectively. In this well 628, there are provided a pressure gauge 631 and a thermometer 632 for indicating pressure and temperature within the chamber 601 when the top 610 is in closed position.

Suitably suspended from the top 610 and so disposed as to fit within the chamber 601 when the top 610 is in closed position, there is the skeleton frame 633 with any suitable arrangement of shelves 634 for receiving the material to be operated upon by the cooker I.

I will now describe the mechanism which I provide for operating the cooker I (illustrated in Fig. 2).

Suitably disposed at any convenient point below the cooker I, there is provided a tank 635 to which is constantly supplied water from the water mains (at a pressure varying from 40 to 90 pounds). In the lower portion of the cooker I, there is located the chamber 636 into the bottom of which enters the pipe 637 from the tank 635, having the valve 638 therein. It is to be noted that the pipe 637 is extended somewhat downwardly into the tank 635. In the chamber 636, there are provided electric heating coils 639. From the top of the chamber 636 there extends the pipe 640 which enters the top of the tank 635. From this pipe 640, I provide supply pipes 641 and 642, through the former of which I may convey heated water to the dish washer H, and the tap T at the sink J, and through the latter of which I may supply heated water for other purposes. In the pipe 640 between the chamber 636 and the pipe 641 there is provided the check valve 643, so designed as to prevent flow from the tank 635 to the chamber 636 when the valve 643 is closed.

Leading from the pipe 640, at a point between the chamber 636 and the check valve 643, there is the pipe 644 which communicates with the interior of the chamber 601. This pipe 644 is provided with a three-way valve 645 for alternatively opening and closing the circuit from the chamber 636, to the chamber 601, and opening and closing the circuit from the chamber 601 to the waste pipe 646. I also provide a condensation chamber 647 connected with the pipe 644 immediately below the chamber 601.

Within the chamber 601, I provide a safety valve 648 and an air supply pipe 649, and on the lower surface of the cover 610 I provide any suitable form of electric hot plate 650.

I will now describe the means which I provide for manual control of the several mechanisms for the operation of the pressure cooker I. I provide five discs 651, 652, 653, 654 and 655 rotatably mounted upon the inner face of the plate 620. The disc 651 is mounted upon the rock shaft 623 and serves to carry the hook 625. The other discs 652, 653, 654 and 655 are carried by pintles 656, 657, 658 and 659 respectively passing through the plate 620. Mounted upon the outer ends of the rock shaft 623 and the pintles 656, 657, 658 and 659 on the outer face of the plate 620 are the operating buttons 660, 661, 662, 663 and 664 respectively.

It is to be noted that the discs 651, 652, 653, 654 and 655 are of the same thickness and positioned in the same vertical plane, and they are so designed and disposed as to permit only a determined sequence of operations, thus obviating the possibility of improper actuation of the operative mechanisms. The relation of the discs 651, 652, 653, 654 and 655 relative to one another is determined by the location of the shaft 623 and the pintles 656, 657, 658 and 659 in the plate 620.

I will now describe the design of each of the discs 651, 652, 653, 654 and 655 (illustrated in Fig. 6). The disc 651 is provided on its periphery with the lune shaped notch $a$ having an arc corresponding with the circumference of the discs 652 and 654. The disc 652 is provided on its periphery with the lune shaped notch $b$ having an arc corresponding with the circumference of the disc 651, and the lune shaped notch $c$ having an arc corresponding with the circumference of the disc 653, and the lune shaped notch $d$ having an arc corresponding with the circumference of the discs 653 and 655. The disc 653 is provided on its periphery with the lune shaped notch e having an arc corresponding with the circumference of the disc 652. The disc 654 has on its periphery a lune shaped notch f having an arc corresponding with the circumference of the disc 651. The disc 655 has on its periphery a lune shaped notch g having an arc corresponding with the circumference of the disc 652. It is to be understood that each of the operating buttons 660, 661, 662, 663 and 664 is designed to correspond in contour with its associated disc.

The disc 652 has pivoted thereto the pitman rod 665 which is operatively connected with the cock 606 on the pipe 604 of the outer water jacket 602, and the valves 638 and 645. The disc 653 has pivoted thereto the pitman rod 666 which is operatively connected with any suitable form of electric switch to control the flow of electricity to the electric coils 639 in the chamber 636. The disc 654 has pivoted thereto the pitman rod 667 which is operatively connected with any suitable form of air valve to control the operation of the elevating means 611 of the cover 610. The disc 655 has pivoted thereto the pitman rod 668 which is operatively connected with the cock provided for the pipe 605 of the inner water jacket 603, and with the valve of the air supply pipe 649.

The pitman rods 626, 665, 666, 667 and 668, are pivoted to the discs 651, 652, 653, 654 and 655 respectively by means of pintles p which pass through slots s in the plate 620, and are fastened to the operating buttons 660, 661, 662, 663 and 664 respectively.

I provide, at any suitable point on the plate 620, an electric switch operating button 669, to control the flow of electric current to the hot plate 630 located in the top 610.

I will now describe the construction of the desiccator L (illustrated in Figs. 1, 3 and 11). Between the wall 7 and the grill and oven compartment F, at the point indicated in Fig. 1, there is the chamber 701 formed by the portion of the wall 7 adjacent thereto, and the wall 702 adjacent the compartment F, the walls 703 and 704, the bottom 705 and the hinged top 706. It is to be noted that the wall 702 merges with the pipe 313 of the compartment F so that the port 314 of the pipe 313 opens into the chamber 701. Passing through the bottom 705 is the vent pipe 707 connected with the evacuator fan 708 driven by the motor M' and having the discharge pipe 709. Suitably disposed in the bottom 705 is the discharge opening 710 controlled by the slide valve 711, slidably mounted on the underside of the bottom 705 and having the operating handle 712 conveniently positioned adjacent the wall 6 near the niche D. It is to be noted that the bottom 705 is downwardly inclined toward the opening 710, to facilitate discharge of material therethrough.

Having described the details of construction, I will now describe the use and operation of my device. It is contemplated that all of the various manually-operated control mechanisms for the operative parts of my device shall be conveniently located adjacent either the niche D or the niche E. The niche D is intended to accommodate the operator of the refrigerating receptacle B, the cabinet and conveyor C, the grill and oven compartment F, the cabinet G, the sink J, and the desiccator L. The niche E is intended to accommodate the operator of the dish washer H and the cooker I. It is obvious that two operators may use the devices operated from each of the niches D and E simultaneously. Attention is called to the fact that I have so disposed the various operative mechanisms in my device that those which perform corelated operations are controlled from points adjacent the niche D. In other words, the operation of the dish washer H and the pressure cooker I are not so likely to be related with the operation of the other parts. Attention is called to the fact that devices B, C, F, G, J and L, are readily accessible (within arm reach) of the operator when seated at the niche D.

I will now describe the operation and use of the refrigerator receptacle B. It is to be understood that any suitable control-mechanism for controlling the operation of the elevating means 101, and 103 provided for the refrigerating receptacle B, is situated adjacent the niche D. When the operator, by manipulating this control device, causes the elevating means 101 and 103 to operate, the top 104 rises from the frame A, carrying thereon the cover 5, and lifts the trays 112, 114 and 116 above the level of the table-top. It is obvious that, if access to only one of these trays is desired, the degree of lift may be accommodated to the purpose desired. When the trays 112, 114 and 116 are in the position indicated in dotted lines in Fig. 3, any one of them can be swung about the pipe 109 to a position over the top 211 and directly in front of the shelf 410, at which point any article on the tray can be readily reached by the operator seated at the niche D. A reversal of the foregoing operation accomplishes the deposit of the articles within the refrigerating receptacle B. Control means for the refrigerating mechanism R is to be suitably positioned adjacent the niche D so that the operator can control the refrigerating process within the receptacle B.

I will now describe the use and operation of the conveyor and storage cabinet C. It is to be understood that any suitable form of manually-operated control mechanism for the elevating means 201 and 202 of the conveyor C is located adjacent the niche D and also that any suitable form of manually-operated control mechanism for the motor M is similarly located. By the proper operation of the elevating means 201 and 202, the frame 210 of the conveyor and cabinet C may be caused to rise. It is obvious that by the proper control of the elevating means 201 and 202 the degree of lift of the frame 210 may be so controlled as to cause any one of the shelves 212, 213 and 214 to register with the horizontal plane of the portions 1—1 of the frame A. When the parts are in the position indicated in Fig. 2, or in lower adjusted similar positions, the operator supplying energy by the motor M may cause the conveyor C to rotate counter-clockwise, as indicated by the arrow in Fig. 1. From the foregoing described operation, it is obvious that any portion of each of the shelves 212, 213 and 214 may be brought adjacent the shelf 410 affording easy access thereto to the operator seated at the niche D. Attention is called to the fact that while the spaces between the shelves 212 and 213 and 213 and 214 may be suitably divided by vertical partitions to provide sectional storage spaces, the shelf 212 provides a continuous annular space between it and the cover 211. When the shelf 212 is caused to register with the top portions 1—1, this space is accessible to any user of the table seated at any point about its periphery. The shelf 212 may be used as a conveyor to move articles about my device. Thus it is obvious that the operator seated at the niche D having prepared food in the compartment F, or having procured articles from the cabinet G, may convey same from a point in front of the shelf 410 to any desired point opposite the periphery of the conveyor C, at which point the article can be readily removed from the conveyor. Conversely the operator seated at the niche E or any person seated adjacent the portions 1—1 or extensions 2—2 may place articles upon the conveyor C so that they may be delivered to the operator at the niche E, as for instance, to convey material to be disposed of in the desiccator L. This continuous shelf 212 is used to receive utensils when same are to be removed from the table for washing. When these used dishes, etc., have been placed upon the shelf 212, the frame 210 is returned to normal position and by the proper manipulation of the reel 528 by the operator in the niche E, the baffle plate 524 is caused to move, from its normal position, across the shelf 212 until the outer end contacts the frame 210. It is obvious that, when the baffle plate 524 is in this position and the conveyor C is caused to rotate, the baffle plate 524 will remove any article upon the shelf 212 causing it to pass through the opening 523 into the chamber 501 of the washer H. Attention is called to the fact that when the baffle plate 524 is in the above described position the signal light 530 serves to call the attention of the operator to this fact, and thus disincline the operator to attempt to actuate the elevating means 201 and 202 of the conveyor C, since it is obvious that the conveyor C cannot be moved vertically when the baffle plate 524 is removed from its normal position. After one complete rotation of the conveyor C, all of the articles having been removed by the baffle plate 524, by reason of such rotation, the baffle plate 524 is returned to normal position.

I will now describe the use and operation of the grill and oven-compartment F. It is to be understood that suitable manually-operated control means for the elevating means 310 is suitably positioned adjacent the niche D. By the operation of this means the operator may cause the chamber 301 to rise above the plane of the table top and thus render easily accessible for use the hot plates 311 so that the chamber 301 may serve as a grill. It is to be understood that any suitable form of manually-operated control means for the plates 311 and 312 are situated adjacent the niche D. It is to be understood that any suitable manually-operated control means for the motor M' is suitably situated adjacent the niche D. By the manipulation of this means the operator may cause the fan 708 to induce a current of air through the slot 318 in the elbow 317 and the pipe 315 and through the desiccator chamber 701 and pipes 707 and 709, thus serving to remove any odorous fumes caused by the operation of the hot plates 311. When it is desired to utilize the chamber 301 as an oven, it may be raised into the position heretofore described and after the articles to be cooked in the oven are placed in the chamber 301, it is returned to normal position and heat supplied by the plates 311 and 312.

I will now describe the use and operation of the cabinet G. It is to be understood that any suitable form of manually-operated control means for the elevating means 401 of the cabinet G is suitably provided adjacent the niche D. By the use of this means the operator, seated at the niche D, may cause the cabinet G to rise so as to cause any one of the shelves 403, 404 or 405 to register with the shelf 410 positioned directly in front of the operator. It is to be noted that when the cabinet G rises from normal position the fingers 408 on the top 402 pass upwardly out of the stirrups 407 and that the section 406 and the lid 410 remain in normal position. If it is desired to raise the lid 410 with the cabinet G, the operator may swing the lid 410 on the hinges 409 so that the lid 410 rests upon the section 406 and the top 402, and the cabinet G, rising, will carry the lid 410 upwardly with it, the fingers 408, stirrups 407 and hinges 409 causing the cover 402, section 406 and over-turned lid 410 to remain in juxtaposition.

I will now describe the use and operation of the dish washer H. While I have indicated in Fig. 3, means for supplying hot water or steam to the interior of the chamber 501, it is to be understood that I may utilize the supply pipe 641 from the cooker I, for this purpose. It is to be understood that any suitable form of manually-operated control means for the water supply pipe 513 is positioned adjacent the niche E. By this means water may be supplied through the pipe 513, the manifold 508 and pipes 509 to fill the chamber 501 to the level of the overflow 516. The dish washer H is brought to this condition before the used dishes, etc., are introduced into the washer by the process heretofore described. The dishes passing through the opening 523 slide downwardly over the lip 522 into the water and onto the inclined bottom of the wire rack 520 and are thus directed toward the bottom of the chamber 501. When it is desired to complete the washing operation, the operator at the niche E by means of any suitable manually-operated control means for the vent 515 can evacuate the water from the chamber 501. The cover 502 is then raised to the position indicated in Fig. 4 by the operation of the elevating means 503, through the manipulation of any suitable form of manually-operated control means positioned adjacent the niche E. The dishes in the chamber 501 are then removed by hand to the dish-assembly drain board 532 directly in front of the niche E. The rack 520, disengaged from the hook 521, may also be removed to the board 532. The dishes are placed properly in said rack 520, which is then placed upon the partition 504. The top 502 is then returned to normal position. The vent 515 having been closed, hot water is supplied to the chamber 501 through the pipes 509, either by the operation of the heating chamber 505 or from the pipe 641. At the same time compressed air from the pipe 514 may be caused to pass through the pipes 509 into the chamber 501, aerating the water therein to assist the washing operation. Shortly after applying the bath to the dishes the slide valve 518 may be opened by pulling the handle 519, thus opening the discharge opening 517 to cause removal from the dish washer H of any refuse matter. After the washing operation has been completed the wash water may be evacuated through the vent 515 and compressed air supplied through the pipe 514 and the pipes 509 to cause a draft through the chamber 501 escaping through the openings 516 and 517, to dry the dishes. The top 502 may then be raised and the rack 520 carrying the clean dishes may be removed to the shelf 532, and the dishes removed from the rack 520 may be placed upon the top 211 of the conveyor C and thereby conveyed to a point adjacent the top 410 from which they may be placed in the cabinet G.

I will now describe the use and operation of the pressure cooker I. It is to be noted that when the parts are in normal position the valve 638 is open and the valve 645 is closed so that water under pressure from the city water-main is supplied from the tank 635 through the pipe 637 filling the chamber 636 and the pipe 640. The circuit being in equilibrium, the check valve 643 is inoperative. The parts mounted upon the plate 620 being in normal position, the operator can turn the operating button 662 and with it the disk 653 operating the pitman 666 and thereby cause electric current to energize the heating coils 639 in the chamber 636, thus heating the water in the chamber 636. It is to be noted that by reason of the fact that the pipe 637 is extended downwardly into the tank 635 while the pipe 640 enters the top of the tank 635 the operation in the chamber 636 will cause cooler water to flow from the lower part of the tank 635 through the pipe 637 into the chamber 636 where it is heated and the heated water will pass from the chamber 636 through the pipe 640 into the upper part of the tank 635. It is obvious that the water thus heated may be supplied through the pipe 641 to the dish washer H or the tap T of the sink J, or through the pipe 642 for any other desired purpose.

When it is desired to use the pressure cooker I, the disk 651 mounted on the plate 620 is moved by its associated operating button 660 so that the hooks 625 are disengaged from the pins 622. This movement of the disk 651 brings the notch a opposite the notch f in the disk 654, thus permitting rotation of the disk 654, by means of the associated operating button 663, which causes the elevating means 611 to lift the top 610 of the pressure cooker, raising with it the skeleton frame 633 and shelves 634, providing facilities for disposing food which is to be cooked, in the chamber 601 of the pressure cooker I. When the articles have been placed upon the shelves 634, the disk 654, is again manipulated by the operating button 663 to cause the top 610 to return to normal position and the disk 654 is then restored to its normal position, under which conditions it is possible to rotate the disk 651 by its associated operating button 660 to cause the hooks 625 to engage the pins 622, thereby locking the top 610 upon the chamber 601. It is to be noted that by reason of the design and disposition of the hooks 625 and the pins 622 a certain degree of pressure downwardly is exerted upon the top 610 by the action of the hooks 625, which causes the top 610 to press the back pressure lip 618 and its gasket 619 upon the gasket 616 on the top of the wall 614 of the chamber 601. The disk 651 being in normal position the notch a permits clockwise rotation of the disk 652 by means of its associated operating button 661. This operation, through the pitman rod 665 closes the valve 638 and opens the valve 645, and also opens the valve 606 permitting water to flow from the pipe 608 through the outer water jacket 604. This operation causes the heating system below the cooker I to supply steam to the chamber 601 through the pipe 644, the safety valve 648 maintaining any desired pressure. It is to be noted that by reason of the design and disposition of the back-pressure lip 618 the steam pressure in the chamber 601 causes this lip 618 to seal the joint between its gasket 619 and the gasket 616. The operation of the cooker during the cooking process may be observed by inspection of the pressure gauge 631 and the thermometer 632 in the well 628. When the cooking process has been completed, the disk 652 is restored to normal position, thereby opening the valve 638 and causing the valve 645 to close the passage in the pipe 644 from the chamber 636 and open the passage from the pipe 644 to the vent pipe 646, thereby permitting escape of the steam from the chamber 601 through the vent pipe 646. The movement of the disk 652 to normal position also causes the cock 606 to close the supply pipe 608 and open the waste pipe 609 thereby evacuating water from the outer water jacket 602 about the chamber 601 and the outer water jacket 612 in the top 610. The return of the disk 652 to normal position causes the notch d thereon to coincide with the notch g of the disk 655 which may then be rotated by means of its associated operating button 664, which operation through the pitman rod 668 admits water to the inner water jacket 603 surrounding the chamber 601 and the inner water jacket 613 in the top 610, and also opens the air vent 649 causing circulation of air through the chamber 601, pipe 644 and vent pipe 646. Attention is called to the fact that the circulation of water through the outer water jackets 602 and 612 serves to assist the effect of the insulation about the chamber 601 to prevent escape of heat into the room. The use of the inner water jackets 603 and 613, which are empty during the cooking process to supply air space surrounding the chamber 601 to assist the maintenance of the proper temperature for cooking in the chamber 601, and filled with circulating cold water immediately following the completion of the cooking process, serves to so lower the temperature in the chamber 601 immediately prior to opening the chamber 601 after the cooking process, that any disagreeable rush of heat into the room is obviated.

It is obvious that the cooker can be opened and the cooked food taken therefrom by the process already described.

It is to be noted that the pressure cooker may be opened and articles placed therein as previously explained, and it may then be closed and that the pressure cooking mechanism may remain inoperative and the cooking process performed by the heating element 650 controlled by the operating button 669.

It is believed that the disclosure of the construction of the sink J and the shelf K in Figs. 1, 4, 5 and 12, clearly indicates the use of these parts. Attention is called to the convenient juxtaposition of the sink J with the grill and oven compartment F, cabinet G and the desiccator L.

I will now describe the use and operation of the desiccator L. By raising the hinged top 706 the operator at the niche D has access to chamber 701 and may deposit undesirable refuse therein. When the lid 706 is closed, the refuse is confined in a substantially airtight chamber through which heated air from the grill and oven-compartment F may be circulated, thereby desiccating the refuse which may be discharged by gravity from the chamber 701 by opening the discharge valve 711, and disposed of in any suitable way.

Having described my invention, what I claim is:

1. In a device for the conservation and treatment of foods and beverages, and utensils therefor, the combination of a base forming a table; a vertically movable and rotatable annular conveyor and cabinet; a vertically movable grill and oven cabinet; a third cabinet, all of the foregoing elements being positioned in said base; a refrigerating receptacle in said base surrounded by the annular conveyor and cabinet and provided with a vertically movable top from which are suspended rotatable shelves; a dish washer positioned in said base and having a vertically movable top; a pressure cooker positioned in said base and having a vertically movable top; a niche in said base between the oven cabinet and third mentioned cabinet; a second niche in said base between the dish washer and the pressure cooker, the niches and their associated elements being positioned on opposite sides of the table; a sink, provided with a hinged lid, positioned in the base adjacent the first mentioned niche, a lid integral with the top of the dish washer positioned upon the base adjacent the second mentioned niche; and a desiccator positioned in said base adjacent the oven cabinet and sink.

2. In an article of furniture, the combination of a base; a receptacle in said base; a vertically movable top for said receptacle; and an article supporting means adjustably related to said top for lateral movement and adapted in one position of adjustment of said top and said means to be positioned in said receptacle, and in another position of adjustment of said top and said means to be positioned over a portion of the top of said base.

3. In a device for the conservation and treatment of foods and beverages, and utensils therefor, the combination of a base; a refrigerating receptacle in said base; a vertically movable top for said receptacle; an eccentrically mounted post depending from said top; and a plurality of trays rotatably mounted on said post adapted in one position of adjustment of the top and trays to be positioned in said receptacle and in another position of adjustment of said top and trays to be positioned above a portion of the top of said base.

4. In a device for the conservation and treatment of foods and beverages, and utensils therefor; the combination of a base having a top; a vertically adjustable rotatable element in said base having a plurality of super-imposed annular shelves; a second rotatable element mounted in a fixed horizontal plane in said base; and connecting means between said elements adapted to cause the rotation of said first element when it is in any of its adjusted positions, when said second element is rotated.

5. In a table, the combination of a base; a receptacle in said base provided with an opening disposed below the top of said base; a rotatable, vertically movable shelf mounted in said base adjacent said receptacle; and a baffle plate hingedly mounted in said base, and so disposed as to close said opening when the shelf is projected above said top, and be positioned across said shelf when said shelf registers with said opening.

6. In a device for the conservation and treatment of foods and beverages, and utensils therefor, the combination of a base; a vertically movable cabinet in said base; a plate resting upon said base adjacent said cabinet and provided with stirrups; fingers mounted on said cabinet and adapted to be received in said stirrups; and a lid hingedly connected with said plate, the parts being so designed and disposed that the lid may be swung upon the hinges and rest upon the plate and the cabinet and when in such position be caused to rise with the cabinet, and that when the lid is not so swung the cabinet moves upwardly without affecting the plate and lid.

7. In a device for the conservation and treatment of foods and beverages, and utensils therefor, the combination of a base; a vertically movable cabinet in said base having a plurality of shelves and a top; a plate resting upon said base adjacent said top and provided with a pair of stirrups; a pair of fingers mounted on said top and adapted to be received in said stirrups; and a lid hingedly connected with said plate, the parts being so designed and disposed that the lid may be swung upon the hinges and rest upon the plate and top and when in such position be caused to rise with the cabinet, and that when the lid is not so swung the cabinet moves upwardly without affecting the plate and lid.

8. In a device for the conservation and treatment of foods and beverages, and utensils therefor, the combination of a base; a vertically adjustable, rotatable element mounted in said base, a second rotatable element mounted in a fixed horizontal plane in said base; and connecting means between said elements adapted to cause the rotation of said first element when it is in any of its adjusted positions, when said second element is rotated.

HOWELL S. VINCENT.